United States Patent [19]

Rechtschaffen

[11] Patent Number: 4,574,349

[45] Date of Patent: Mar. 4, 1986

[54] APPARATUS FOR ADDRESSING A LARGER NUMBER OF INSTRUCTION ADDRESSABLE CENTRAL PROCESSOR REGISTERS THAN CAN BE IDENTIFIED BY A PROGRAM INSTRUCTION

[75] Inventor: Rudolph N. Rechtschaffen, Scarsdale, N.Y.

[73] Assignee: International Business Machines Corp., Armonk, N.Y.

[21] Appl. No.: 591,705

[22] Filed: Mar. 21, 1984

Related U.S. Application Data

[63] Continuation of Ser. No. 249,270, Mar. 30, 1981, abandoned.

[51] Int. Cl.$^4$ .............................................. G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,854,126 | 12/1974 | Gray et al. | 364/200 |
| 3,938,096 | 2/1976 | Brown et al. | 364/200 |
| 3,955,180 | 5/1976 | Hirtle | 364/200 |
| 4,068,303 | 1/1978 | Morita | 364/200 |
| 4,103,329 | 7/1978 | Davis et al. | 364/200 |
| 4,110,830 | 8/1978 | Krygowski | 364/200 |
| 4,130,867 | 12/1978 | Bachman et al. | 364/200 |
| 4,155,118 | 5/1979 | Lamiaux | 364/200 |
| 4,200,927 | 4/1980 | Hughes et al. | 364/200 |
| 4,250,548 | 2/1981 | Kindell | 364/200 |
| 4,280,177 | 7/1981 | Schorr et al. | 364/200 |
| 4,287,561 | 9/1981 | Liptay | 364/200 |
| 4,300,192 | 11/1981 | Couleur et al. | 364/200 |

Primary Examiner—Gareth D. Shaw
Assistant Examiner—Daniel K. Dorsey
Attorney, Agent, or Firm—Robert W. Berray

[57] ABSTRACT

Each of a plurality of stored pointers identifies and accesses one of a plurality of hardware registers in a central processing unit (CPU). Each pointer is associated with and corresponds to one of a limited number of general purpose registers addressable by various fields in a program instruction of the data processing system. At least one program instruction calls for transfer of data from a particular main storage location to a general purpose register (GPR) identified by a field in the program instruction. The GPR identified as the destination for the data is renamed by assigning a pointer value to provide access to one of the plurality of associated hardware registers. A subsequent load instruction involving the same particular main storage location determines if the data from the previous load instruction is still stored in one of the hardware registers and determines the associated pointer value. The data in the hardware register is made immediately available to the CPU before completion of the access to main storage. The pointer value is associated with, and made to correspond to the destination GPR of the subsequent load instruction. Other instructions which require access to instruction addressable GPR's cause access to the corresponding pointer value to provide access to the corresponding hardware register for purposes of data processing.

4 Claims, 6 Drawing Figures

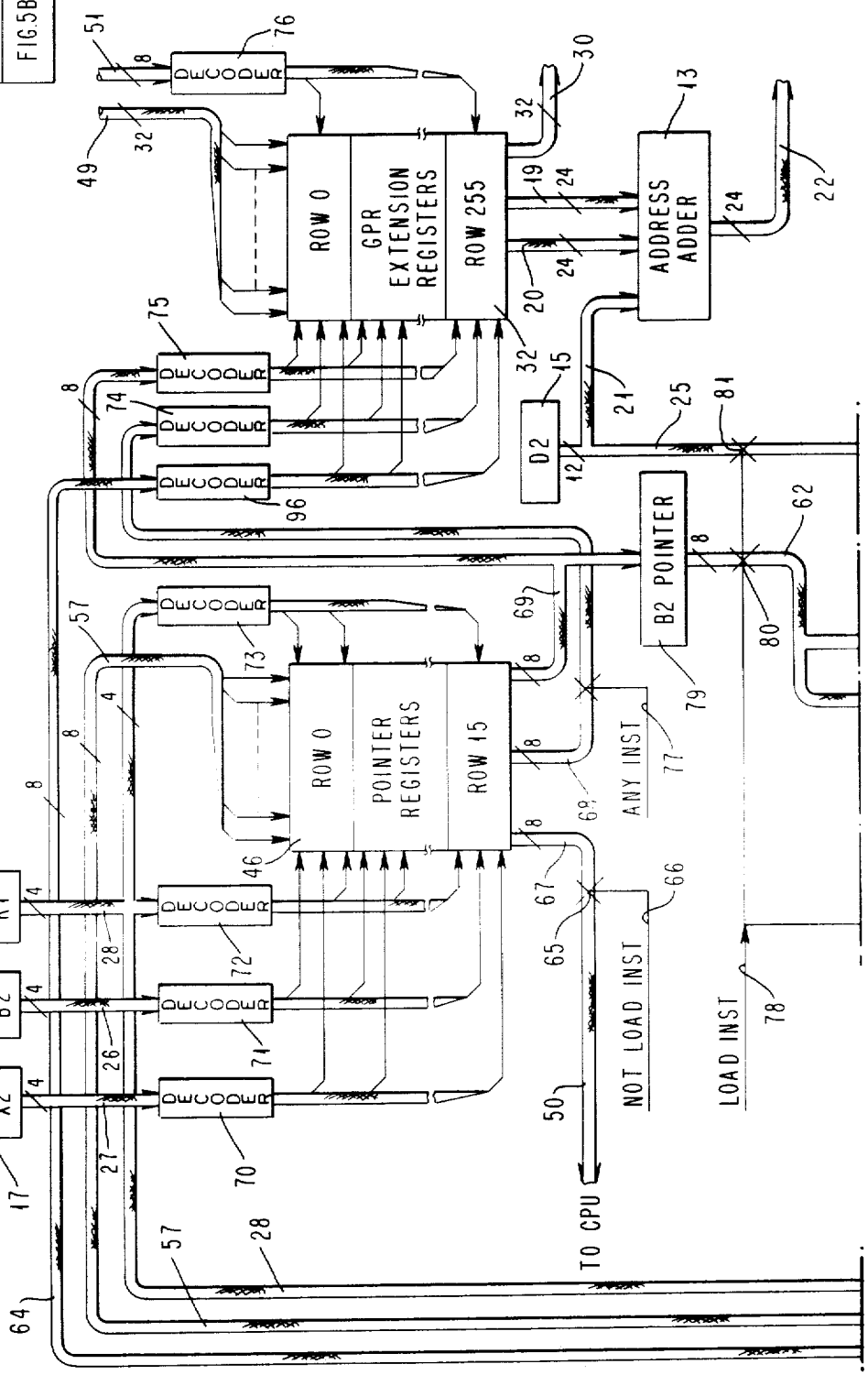

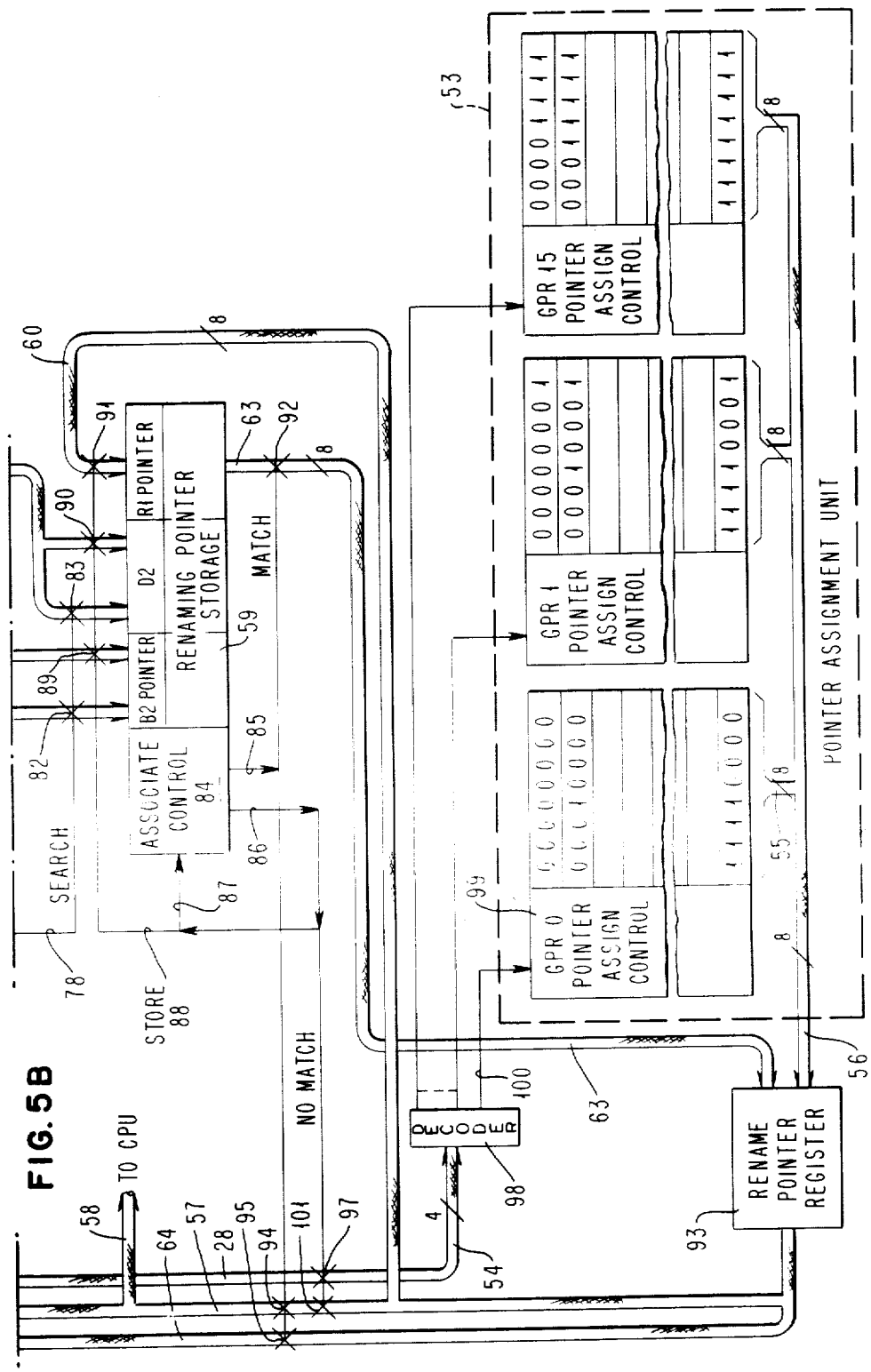

APPARATUS FOR ADDRESSING A LARGER NUMBER OF INSTRUCTION ADDRESSABLE CENTRAL PROCESSOR REGISTERS THAN CAN BE IDENTIFIED BY A PROGRAM INSTRUCTION

This is a continuation, of application Ser. No. 249,270 filed Mar. 30, 1981 now abandoned.

CROSS-REFERENCE TO U.S. PATENTS

The following U.S. patents, all assigned to the assignee of the present invention are incorporated by reference into this description:
1. U.S. Pat. No. 4,200,927 by J. F. Hughes et al entitled "Multi-Instruction Stream Branch Processing Mechanism", issued on Apr. 29, 1980.
2. U.S. Pat. No. 4,280,177 issued July 21, 1981 by H. Schorr et al entitled "Implicit Address Structure And Method For Accessing An Associative Memory Device".
3. U.S. Pat. No. 4,287,561 issued Sept. 1, 1981 by J. S. Liptay entitled "Address Formulation Interlock Mechanism".

FIELD OF THE INVENTION

This invention relates generally to data processing systems and, more specifically, to apparatus that provides a greater number of accessible general purpose hardware registers in a central processing unit than can be addressed by a program instruction.

BACKGROUND OF THE INVENTION

The subject invention finds use in a high performance data processing system described in the abovecited Cross-Reference 1, and which functions in accordance with the requirements of IBM System/370 data processing systems as defined by the "System/370 Principles of Operation", Form No. GA22-7000.

There are a number of instruction formats defined for the IBM System/370 data processing systems, and many include one or more 4-bit binary fields each of which identify a particular instruction addressable General Purpose Registers (GPR) out of 16 provided in hardware in a Central Processing Unit (CPU). The GPR's have various uses as defined by a programmer.

The various uses for the GPR's is best represented with reference to a particular System/370 instruction defined as a load instruction. In addition to an 8-bit operation field specifying the load instruction, there are three separate 4-bit fields which identify various GPR's. The instruction also includes a 12-bit field (D2) which is an address displacement value. One of the 4-bit fields (R1) identifies a GPR which is to receive and store data accessed from an addressable main storage device. Another of the 4-bit fields (B2) identifies a GPR which stores a base address value. The third 4-bit field (X2) identifies a GPR which provides an address index value. The particular main storage addressable location to be accessed is determined by adding the D2 address displacement value to the base address value stored in the GPR identified by B2, which is further modified by adding to this value the contents of the GPR identified by X2. When the particular main storage address is accessed, the data is transferred to the GPR identified by the R1 field.

Other program instructions may have the same general format as the above defined load instruction but the data accessed from a particular main storage address may, for example, be added to the contents of a GPR identified by R1, and the result stored back into the GPR identified by R1. As with the load instruction, an address generation step is required in which the contents of GPRs identified by B2 and X2 are added to the address displacement field D2 for the purpose of generating the particular main store address of the data to be added to the contents of the register identified by R1.

Many data processing systems, including the one described in the above identified References require at least three separate phases to the handling of each of sequential program instructions. These phases include: (1) the fetching or accessing of an instruction from storage to an instruction register; (2) the decoding of the operation code with main storage address generation if required; and (3) instruction execution. In some data processing systems, certain of the phases may be overlapped. That is, an instruction fetch and/or decode and address generate phase may be performed simultaneously with the execution of an instruction previously decoded.

Certain data processing systems also include a high speed buffer or cache between the main storage device and the CPU. The high speed cache provides faster access to data recently accessed from the main storage device. In some systems, two CPU cycles might be required to access data from the high speed cache, and substantially more CPU cycles would be required to access data from the main storage device. Cross-Reference 2 discloses an improved technique for accessing data in a cache by effecting an associative search for data in the cache using information combined to form a main storage address instead of combining the information to form the address and then using the address for the search.

In the above-identified Cross-Reference 3, the inventive subject matter concerned hardware logic that must be provided in a high performance data processing system, with some degree of overlap of instruction fetch/decode and instruction execution, to detect a sequence of program instruction execution giving rise to an "address generate interlock". This occurs when an instruction being decoded includes address generation requiring use of the contents of a GPR identified by a B2 field as a base address value, and the GPR identified by the B2 field of the instruction being decoded is the same GPR identified by the R1 field of a previous load instruction. The interlock results when the GPR has not yet received the information from the main storage device in response to the load instruction. The address generation interlock inhibits further instruction decoding and address generation until the previous load instruction has been executed. As recognized from the above discussion concerning high-speed caches and main storage devices, the wait for the data, before decoding can proceed, may involve only two CPU cycles or could involve a substantial number of the CPU cycles.

Multiprogramming techniques, task switching, subroutine branching, and many program loops within a program sequence require frequent need to store the present contents of GPR's in main storage and reload new information into the GPR's for a new program sequence. Each time a new program sequence is initiated in the data processing system, there will be a need for one or more of the GPRs to be loaded with base address information and other addressing information utilized during the program sequence, creating many address generation interlock situations.

If more instruction addressable GPR's were provided, more efficiency could be achieved in shifting between program sequences. To increase the number of instruction addressable registers, prior art techniques would suggest the need to provide additional binary bits in the register addressing fields of all instructions. The many programs already written in accordance with the IBM System/370 instruction format would have to be substantially changed.

SUMMARY OF THE INVENTION

It is a primary object of the present invention to provide a greater number of instruction addressable hardware registers in a central processing unit (CPU) than can be identified by register addressing fields of a program instruction.

It is another object of the present invention to provide a plurality of accessible hardware registers in a CPU associated with, and corresponding to, each general purpose register (GPR) of a limited number of instruction addressable GPR's.

Another object of the present invention is to provide a mechanism for implementing a plurality of accessible hardware registers in a CPU associated with and corresponding to each one of a limited number of program instruction addressable registers, wherein each of the plurality of accessible hardware registers retain the value of data transferred from a particular main storage addressable location to an identified instruction addressable register in accordance with a like plurality of previous load instructions identifying the same instruction addressable register.

These and other objects of a preferred embodiment of the present invention are achieved by providing, for each of 16 instruction addressable GPR's, 16 accessible hardware registers in a CPU. Corresponding to each of the 16 GPR's, and accessible by a four-bit field of an instruction identifying a GPR, is a pointer register for identifying and accessing one of the plurality of 256 hardware registers in the CPU.

Also associated with each of the instruction addressable GPR's is a pointer assignment mechanism, providing 16 unique pointer values for each of the instruction addressable GPR's. The pointer assignment mechanism associated with a particular GPR is rendered effective the first time a load instruction initiates transfer of data to the GPR identified by an R1 field from a particular main storage location identified by the 12-bit D2 field and contents of a GPR identified by the B2 field of the load instruction. The pointer value is stored in a pointer register associated with the GPR identified by R1. The pointer value also causes access to the identified hardware register, and the data from the particular main storage location will be transferred to, and stored in, the hardware register. The pointer assignment mechanism is stepped to another unique value for use by a different and subsequent load instruction identifying the same GPR.

A final element in the preferred embodiment of the present invention is a pointer storage mechanism having an associative form of access. Each of 256 entries is comprised of a pointer value corresponding to the B2 field, and the 12-bit D2 field, utilized during execution of a load instruction for accessing a particular main storage location. The entry also includes the pointer value corresponding to the GPR identified by the 4-bit R1 field and used for accessing the hardware register which received the data from the particular main storage location.

Each time a load instruction is to be executed, the mechanism just described is utilized in associative search of the entries of the pointer storage to determine whether or not the particular main storage location has been previously accessed by a load instruction, and will determine the one of the 256 hardware registers which contains the data. If the R1 field of the new load instruction identifies a GPR different than the previous load instruction, the mechanism will cause the proper pointer value to be entered into the pointer register associated with the new GPR. This is accomplished by doing an associative search of the pointer storage utilizing the pointer associated with the B2 field and the D2 field of the new load instruction to see if there is a corresponding entry in the pointer storage. If there is a previous entry, the pointer value of the hardware register containing the data will be read out and stored in the pointer register corresponding to the GPR identified by the R1 field of the new load instruction.

The hardware register containing the data transferred from the particular main storage location by the previous load instruction will be made immediately available to the CPU. This eliminates the time required for main store to be accessed and the data transferred to the CPU. If the particular main storage location stores a base address value to be used by a subsequent instruction, then there is no need for the address generation interlock, and the subsequent instruction can be immediately decoded without waiting for the transfer from main storage to the CPU.

A new load instruction which does not find an associative match in the pointer storage will initiate the operation of the pointer assignment unit corresponding to the GPR identified by the R1 field. A new entry will be stored into the pointer storage identifying the pointer of the B2 field, the D2 field, and the new pointer value assigned.

BRIEF DESCRIPTION OF THE DRAWINGS

FIG. 5A and FIG. 5B, when arranged in accordance with FIG. 5 is a more detailed logic block diagram with interconnection paths of all the functional units of the present invention.

DETAILED DESCRIPTION OF THE INVENTION

Cross-Reference 1 discloses a data processing system discussing various phases of instruction handling which include instruction fetch, instruction decode and address generation, and instruction execution. The above referred to "System/370 Principles of Operation" discloses the various instruction formats of System/370 data processing systems, and in particular the use of general purpose registers (GPR) by various instruction formats. Cross-Reference 3 provides a discussion of the various uses of GPR's in System/370, and discusses the concept of "address generation interlock", the adverse effects of which the present invention alleviates.

Figure 1:
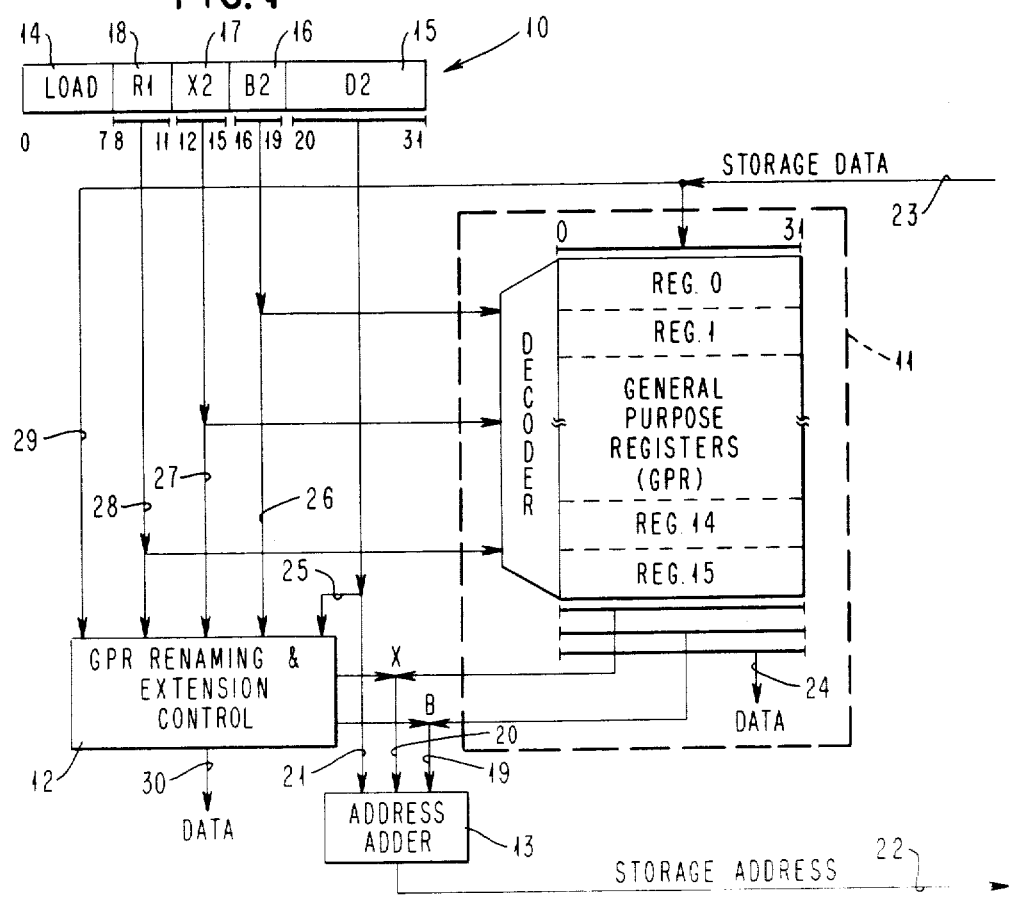
FIG. 1 is a logic block diagram showing the relationship between the binary fields of a load instruction in an instruction register of a CPU, instruction addressable GPR's identified thereby, and the inputs and outputs of the mechanism of the present invention renaming the GPR's to one of a plurality of extension hardware registers.

FIG. 1 discloses only that part of any System/370 data processing system required to understand the present invention. The present invention is characterized as an addition to any central processing unit (CPU) which responds to System/370 instructions in an instruction register 10. The instruction shown is one instruction format that requires access to instruction addressable GPR's noted at 11. The GPR's have been included within a dashed line block. The present invention identified as GPR RENAMING AND EXTENSION CONTROL 12 eliminates the need for a separate set of 16 GPR's addressable by instructions in the instruction register 10. The other major functional unit of most CPU's included in FIG. 1 is the Address Adder 13.

A System/370 instruction of particular concern to the present invention is shown in the instruction register 10. The decoding of an 8-bit operation field 14 indicates a load instruction as distinguished from other instructions having the same format. A first field 15, labeled D2 and comprised of 12 binary bits, is a programmer's method of identifying a particular addressable main storage location. A number of second binary fields 16, 17 and 18, each comprised of four binary bits, are utilized to identify and access a particular GPR to be utilized in executing the instruction. The GPR identified in field 16, and labeled B2, stores a base address value. The four-bit field 17, labeled X2, identifies a GPR storing an address index value. Four-bit field 18, labeled R1, identifies the GPR which is to receive and store the data accessed from the main storage device by the generated storage address.

Execution of the load instruction first involves, during the instruction decode and address generate phase, the access of the data content of GPR's identified by the B2 and X2 fields which are transferred to the address adder 13 on lines 19 and 20 along with the 12-bit D2 field representing the address displacement value to be added to the base address value. The D2 field is presented to the address adder 13 on line 21. The resultant addition of these values in the address adder 13 is transferred on line 22 to the main storage device to initiate access to the particular main store location.

When the storage access has been completed, the storage data is returned on line 23 to be stored into the GPR accessed by the R1 field 18.

Various other System/370 instruction formats provide GPR identifying information to access the GPR's to read out data on a line 24 for use in the arithmetic and logic unit of the CPU. The results of the arithmetic operation may be stored into various of the GPR's.

The provision of only 16 instruction addressable hardware registers in System/370 data processing systems has been a limiting factor in performance. Therefore, the GPR's 11 are to be replaced in accordance with the present invention with the GPR Renaming and Extension Control 12. As part of this mechanism, to be more fully explained, a greater number of hardware registers will be provided for access for readout or readin. The number of additional hardware registers is substantially greater than the 16 provided by the System/370 definitions. Logic will be described which performs a renaming of GPR's identified by the various fields 16, 17 or 18 to provide a correspondence with a particular one of the plurality of additional hardware registers provided.

The register renaming function to provide consistent assignment and correspondence between a particular instruction identified GPR and a particular one of a plurality of hardware registers, is rendered effective by utilizing the D2 field 15, and B2 field 16, as inputs 25 and 26 respectively. The GPR Renaming and Extension Control 12 also receives inputs 27 and 28 corresponding to the X2 field 17 and R1 field 18 respectively.

As part of the address generate phase of the decode of a load instruction, the inputs 26 and 27 will be effective to access the proper one of a plurality of hardware registers to provide the base address value on line 19 and the proper index value on line 20 to the Address Adder 13. These inputs along with input 21 representing the address displacement value D2 will be effective in the Address Adder 13 to provide the storage address on line 22. The storage data 23 returned from the storage device will be provided on an input 29 to the GPR Renaming and Extension Control 12 for entry into the proper one of the plurality of hardware registers. Access to the hardware registers in response to other instructions will provide the data output on line 30 for further processing in the CPU.

By providing the GPR Renaming and Extension Control 12, the GPR registers represented at 11 can be eliminated from the data processor implementation. The processor will still function in accordance with the System/370 Principles of Operations and previous programs written in accordance with that definition.

Figure 2:
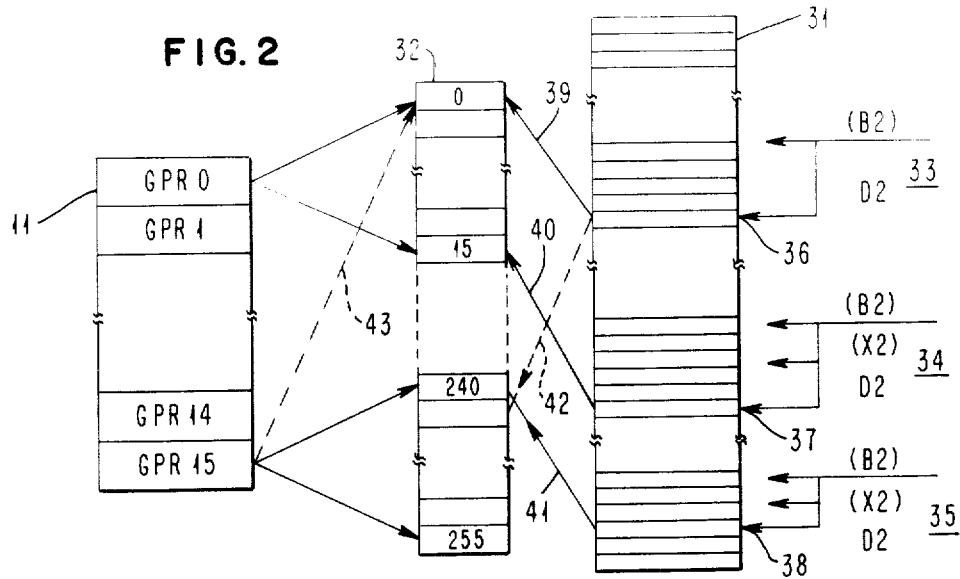
FIG. 2 shows a relationship of instruction addressable GPRs to a plurality of hardware registers in a CPU, and addressable main storage locations.

FIG. 2 will show the desirable results achieved by incorporating the present invention. A main storage device comprising a plurality of addressable locations is represented at 31, and the 16 GPR's to be replaced by the present invention are again represented at 11. The number of hardware registers to be provided as replacement for the GPR's 11 can vary, but in a preferred embodiment, 256 have been provided and are represented at 32.

The present invention can control the renaming of 16 hardware registers for each of the GPR registers defined for System/370. For example, out of the 256 hardware registers provided, numbers "0" through "15" are shown as being associated with GPR "0", and hardware register numbers "240" through "255" will be associated with GPR "15".

Three different load instructions are represented at 33, 34, and 35 in FIG. 2. The instruction at 33 will identify a particular main store location 36 by adding the address displacement value D2 to the contents of a GPR identified by the B2 field. Represented at 33 is the fact that if the X2 field of a load instruction has a value of "0", no address indexing is called for. The instruction at 34 shows that a GPR other than "0" has been identified by the X2 field, and when combined with the contents of the GPR identified by B2 and the address displacement value D2 will address a particular main storage location 37. The instruction at 35 is shown to be addressing a particular main store location 38.

In FIG. 2, both of the load instructions 33 and 34 are shown to have had an R1 field 18 identifying GPR "0". Prior to the present invention, if two different main store locations call for the loading of information into the GPR "0", the data loaded by the first load instruction would be destroyed by the second load instruction. When the present invention is implemented, 16 different load instructions all identifying GPR "0" in the R1 field 18, and each identifying 16 different main storage locations, will be effective to retain the data from the 16 different load instructions in hardware registers "0" through "15".

As represented in FIG. 2, the transfer of data from main store location 36 to a hardware register corresponding to the GPR "0", will transfer the data on line 39 to hardware register numbered "0". If the load instruction represented at 34 is the 16th load instruction calling for the loading of data into GPR "0", the data from the particular storage location 37 will be transferred on line 40 to hardware register number "15". If the load instruction represented at 35 calls for the loading of data in the particular main store location 38 to GPR "15", and this is the first load instruction identifying GPR "15", the data will be transferred on line 41 to hardware register number "240".

If the load instruction represented at 33 is executed for a second time during the overall sequencing of a program of instructions, the logic of the present invention will recognize that the data transferred from location 36 on line 39 is still valid in hardware register number "0", and the data stored in the register will be transferred to the CPU to permit further data processing without waiting for the main store 31 to finish cycling for the requested data transfer from location 36.

The dotted lines 42 and 43, are representative of a program sequence indicating that the load instruction represented at 33 calls for access to main store location 36, but calls for the data to be transferred to GPR "15". The present invention will recognize that there is no need for assigning a hardware register 32 to receive the data on line 42. Rather, as indicated by dotted line 43, the logic will recognize that the data in main store location 36 has previously been transferred on line 39 to hardware register number "0", and will cause any further references to GPR "15" to access hardware register number "0" during further data processing. Once again, the CPU can be notified that the data to be transferred from main store 31 to the CPU is already available, and further processing can immediately proceed using the data stored in hardware register number "0". If the data intended for storage in GPR "15" is to be used as a base address in subsequent instructions, it is immediately available from hardware register number "0". No address generate interlock is created.

Other System/370 instructions, including GPR identifying fields, will automatically be provided access to the proper one of the hardware registers 32 which at that point in time is associated with and corresponds to the identified GPR.

Figure 3:
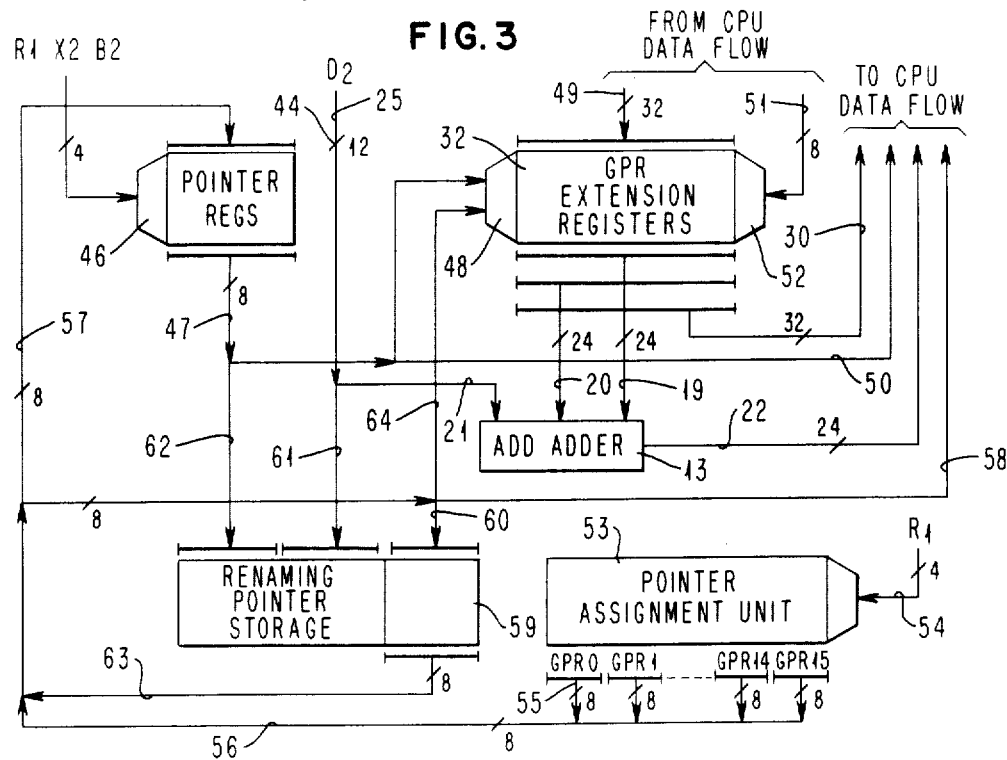
FIG. 3 is a block diagram with interconnection paths showing all of the major units of the present invention.

In the discussion of the following figures, any functional units or lines referred to in previous figures will be provided with the same numeric designation. For example, the 256 hardware registers 32 discussed in FIG. 2 are shown in FIG. 3 and have been named GPR Extension Registers. Further, all of the lines interconnect various functional units in the figures are cables or busses which transfer a plurality of binary bits in parallel from one unit to the other. The representation at 44, in connection with line 25, indicates a bus or cable for the parallel transfer of the 12-bit D2 field 15 from the instruction register 10 to the input of other functional units.

As already indicated, each of the 16 GPR's which are instruction addressable, can have various uses. The use to which the GPR is put is dictated by the position of the 4-bit field in an instruction. The particular instruction addressable GPR identified must be effective to access a proper one of the 256 hardware registers 32. The association of a particular GPR identified on line 45 with a particular one of the GRP Extension Registers 32 is effected by a plurality of Pointer Registers 46. There is an 8-bit pointer register associated with each instruction addressable GPR. The 4-bit identification of a GPR on line 45 will be effective to access the associated Pointer Register 46 to read out on line 47 the present value of the pointer. The pointer is applied to an access means 48 associated with the hardware registers 32 to provide access to the corresponding hardware register for read-in or read-out.

If the System/370 instruction being executed at the time involves two identified GPR's, the data read out of the corresponding hardware registers 32 will be transferred on line 30 to the proper CPU data flow registers for processing. If the results of data processing in the CPU are to be stored in an instruction identified GPR, the mechanism will be effective to receive that data on line 49 from the CPU data flow for storage in the proper one of the hardware registers 32. During any instruction execution which includes an R1 field, the results of the data processing are to be stored into the GPR identified by the R1 field. The pointer accessed from the Pointer Registers 46 correrponding to the GPR identified by the R1 field is sent on a line 50 to the CPU data flow. When the result of the processing is complete, and the data returned on line 49 for storage in the hardware registers 32, the pointer value identifying the particular hardware register 32 is also returned on a line 51 to provide access in a decoder 52 to the proper hardware register 32.

As mentioned in connection with the discussion of FIG. 2, the data transferred from a main storage device to one particular GPR from 16 different load instructions identifying 16 different particular main storage locations will be retained in the hardware registers 32. A Pointer Assignment Unit 53 responds to the instruction identified GPR indicated by the R1 field on line 54 of the load instruction, to render effective the proper one of sixteen pointer assignment units. For example, as each new load instruction is executed which identifies GPR "0" as the destination register, per the coding of the R1 field on the input 54, a unique 8-bit pointer value associated with each of the sixteen load instructions, as executed, will be read out on line 55 and transferred by lines 56, 57, and 58 to various units.

The newly assigned pointer value on line 57 will be stored into the Pointer Register 46 associated with the GPR identified by the R1 field of the load instruction on line 28 shown in FIG. 1. The new pointer value on line 58, is transferred to the CPU data flow, and will be utilized on line 51 when the data accessed from the main storage device is returned on line 49 to be stored in the hardware register 32. The hardware register has been associated with the instruction addressable GPR identified by the R1 field by the pointer assignment unit 53, and the pointer value has been stored in the proper one of the pointer registers 46.

Also discussed in connection with FIG. 2 was the sequence of load instruction executions wherein an instruction such as 33, which identifies a particular main store location 36, is executed for a second time, but designates a different GPR to be the destination of the data. The logic of the present invention will be able to determine that the data from location 36 is already stored in hardware register "0" and will cause the pointer value "0" to be stored in the pointer register 46 associated with GPR "15". This capability is achieved by the Renaming Pointer Storage 59. The Renaming Pointer Storage 59 is an associative memory which functions identically to the associative memory device discussed in detail in Cross-Reference 2. The associative storage device 59 has 256 entries which are assigned in sequence as load instructions are executed. When 256 entries have been made in the Renaming Pointer Storage 59, the storage is reset and another 256 entries are made in response to load instructions.

As load instructions are executed for the first time, unique pointer values assigned by Pointer Assignment Unit 53, and stored in the Pointer Registers 46 for each of the GPR's, an entry is created in the Renaming Pointer Storage 59. The entry created for each load instruction is comprised of the newly assigned pointer value for the GPR identified by the R1 field and is stored in the entry by line 60. The particular main storage location addressed by the load instruction creating the new entry in the Renaming Pointer Storage 59 is identified by the 12-bit D2 field stored into the entry on line 61, and the 8-bit pointer value accessed from the Pointer Register 46 associated with the GPR identified by the B2 field, and which is stored in the entry on line 62.

As each load instruction is decoded for execution, an associative search is effected in the Renaming Pointer Storage 59. The associative search uses as search arguments, the 12-bit D2 field on line 61, and the pointer value from the Pointer Register 46 corresponding to the GPR identified by the B2 field on line 45. This pointer value, identifying a GPR Extension Register 32 storing a base address, is used as a search field on line 62. If a match is found in the Renaming Pointer Storage 59, this indicates that a previous load instruction utilizing the same B2 field and D2 field has been executed. In response to the match condition, the entry of the pointer value of the GPR Extension Register 32 already containing the data is transferred by line 63 and line 57 for storage in the Pointer Register 46 identified by the R1 field on line 45 of the load instruction being executed. The pointer value read out on line 63 is transferred to the GPR Extension Registers 32 on line 64 to cause access to that hardware register for presentation of the data to the CPU data flow on line 30.

If the associative search of the Renaming Pointer Storage 59 does not detect a match, then the Pointer Assignment Unit 53 is rendered effective to cause another pointer value to be assigned to the GPR identified by the R1 field, and this is transferred for storage into the Pointer Registers 46 on lines 56 and 57, and a new entry is made in the Renaming Pointer Storage 59 from Lines 60, 61 and 62.

At this point, the concept of "validation" will be discussed. One of the objects of the present invention is to make data available as soon as possible to the CPU data flow. This is particularly desirable if the data in a GPR is to be utilized as base address information in a subsequent instruction decode address generate phase. It was indicated earlier that programming sequences may change as a result of multiprogramming, multitasking, branching, etc. Therefore, even though a particular load instruction may have the same B2 field and D2 field of at least one of the previous 256 load instructions, for which there is an entry in the Renaming Pointer Storage 59, the new load instruction may in fact cause access to a particular main storage location different from the previously executed load instruction. This may be so if the base address value in the GPR identified by the B2 field is different. Also, an address index value in a GPR identified by the X2 field will change the particular main storage location addressed, even if the base address value and address displacement value in the D2 field are the same.

The finding of a match in the Renaming Pointer Storage 59 causes data from the GPR Extension Register 32 to be made available to the CPU on line 30. Even so, the address information on line 22 is sent to the main storage device to cause data to be accessed from the data storage device and transferred to the CPU. When the data from the particular main storage location is returned to the CPU, it is compared with the data sent to the CPU on line 30 as a result of the finding of a match in the Renaming Pointer Storage 59. If the data returned from the main storage device is equal to the data transferred on line 30, processing in the CPU continues. If it is discovered that the data returned from the main storage device is not identical to the data transferred to the CPU on line 30, the processing which has continued as a result of the match indication, will be voided. At that point, the CPU data flow will cause the data returned from the main storage device to be stored in the GPR Extension Register 32 by presenting the data on line 49. Access to the proper register will be effected by returning the pointer value, previously received on line 58 by the CPU, on line 51 to the decoder 52. Substantial gain can be achieved by finding matches for data in the hardware registers which corresponds to data accessed from the main storage device, but the validation sequence is required to insure correct operation.

Figure 4:
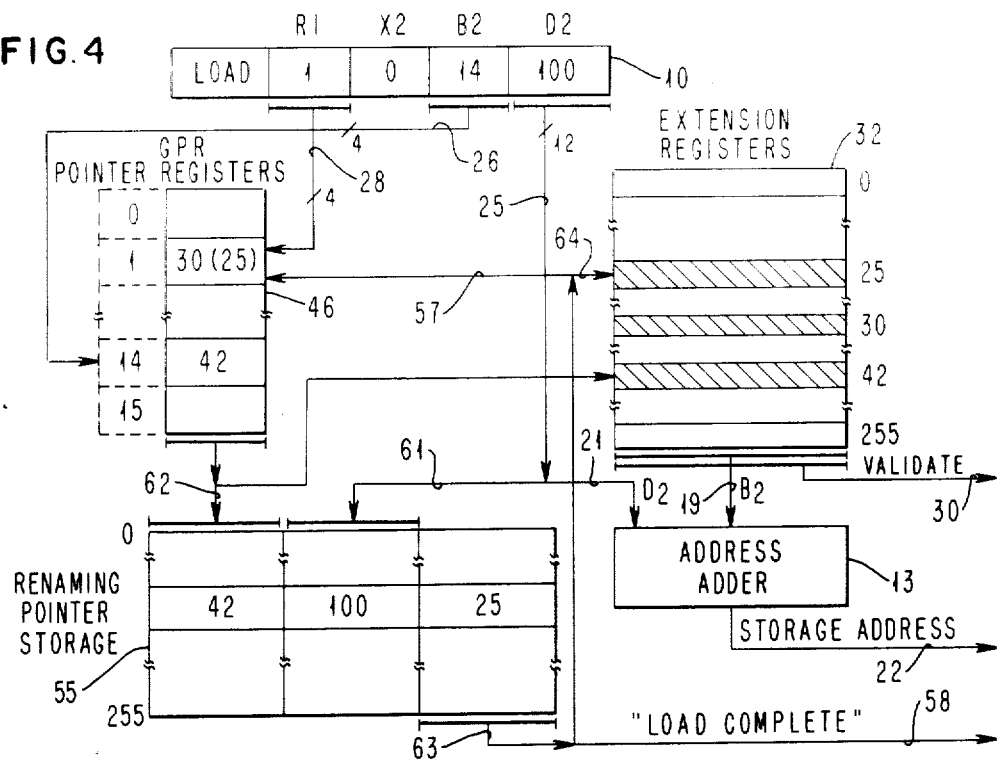
FIG. 4 is a logic block diagram with interconnections giving an example of how renaming of a GPR takes place to identify one of a plurality of hardware registers previously loaded, with data from main storage.

FIG. 4 will be utilized to provide an example utilizing some specific values which shows the logical operation of the present invention. As a result of the execution of previous instructions in an instruction sequence, any references to GPR "1" will cause access to GPR Extension Register number "30". Also, as the result of some previous instruction execution, a program instruction identifying GPR number "14" would have caused base address information to be stored into GPR Extension Register number "42". A previous instruction execution would have stored data from a particular main storage location into GPR Extension Register number "25". The one entry shown in the Renaming Pointer Storage 59 indicates the information used in some previous load instruction that caused data to be returned from a particular main storage location and stored into GPR Extension Register number "25". That information indicates that the particular storage address generated by the address adder 13 to access the main storage location for transfer of data to GPR Extension Register number "25" utilized GPR Extension Register number "42" as a base address value to which was added an address displacement value of "100".

The load instruction shown in instruction register 10, when executed, indicates that GPR "1" is to be loaded with information from a particular main storage location identified by the B2 field and D2 field. The B2 field identifies GPR "14" as being the source of the base address information. The 4-bit field on line 26 will access GPR Pointer Register "14" to read out the pointer value "42" to access extension register "42" for presentation on line 19 to the Address Adder 13. Also, the D2 field value "100" will be applied on line 21 to the Address Adder 13 to generate the storage address 22.

The readout of the pointer value "42" corresponding to the B2 field identifying a base address, is applied along with the D2 field value "100" to the Renaming Pointer Storage 59 on lines 62 and 61 respectively to effect an associative search of all the entries in the Renaming Pointer Storage 59. In accordance with the information shown in FIG. 4, a match will be detected causing a readout of the pointer value "25". The pointer value "25" readout on line 63 will be transferred on line 64 to the access mechanism of the GPR Extension Registers 32 to provide access to register "25" to readout the data on line 30 to be transferred to the CPU data flow. The pointer value "25" will also be stored in GPR Pointer Register number "1" corresponding to, and accessed by, the 4-bit field on line 28 representing the R1 field of the load instruction being executed. Further instruction identification of GPR "1" will be directed to GPR Extension Register "25" instead of "30". The data in register "30" will be retained for possible subsequent use, or until replaced by a subsequent reassignment.

The finding of a match in the Renaming Pointer Storage 59 causes the pointer value "25" to be transferred on line 58 to the CPU data flow. This also provides an indication to the CPU data flow of "load complete" indicating that further instruction processing can proceed. The data sent to the CPU data flow on line 30 will be compared with the data returned from the addressed main storage location. If the data are not identical, the pointer value "25" will be returned by the CPU data flow to cause the proper data from the main storage location to be stored in GPR Extension Register "25".

The ability to transfer the data content of GPR Extension Register "25" immediately to the CPU data flow on line 30 without waiting for the data transfer from the main storage device is apparent if the instruction to be executed immediately following the load instruction shown in instruction register 10 includes a B2 field which identifies GPR "1". This means the data to be loaded into GPR "1" is base address information to be utilized in subsequent instruction decoding and address generation, and the need for an address generate interlock is eliminated.

FIGS. 5A and 5B when arranged in accordance with the showing of FIG. 5 disclose further details of the subject invention. Once again, reference to cables or units will be given the same numeric designation if previously discussed. A new representation is shown in FIGS. 5A and 5B, and is represented at 65 on cable 50 connecting the Pointer Register 46 to the CPU. During the instruction decode or execute phase of any data processing system, various logic output signals or control signals will be generated during the sequencing of the data processing system. These signals will be generated in response to microinstructions if the data processing system is a microprogrammed control system, or in response to hardware sequencers utilized in some data processing systems. The representation at 65 indicates that when a control signal (Not Load Instruction) on line 66 is generated, a gate circuit associated with each of the 8 individual lines of a cable 67 will be enabled to cause parallel transfer of the data on cable 50 to the CPU.

The Pointer Registers 46 and GPR Extension Registers 32 are hardware registers comprised of bi-stable storage devices. Each device, representing a binary bit position, may have several sets of output gates. Each set of gates associated with a particular register are responsive to an enabling signal from a decoder for effecting a parallel transfer of data in a register to an output bus. In the case of the Pointer Registers 46, three different output busses are provided at 67, 68, and 69 which can simultaneously provide outputs in response to energizing signals from corresponding decoders 70, 71, and 72. Each binary bit position of a particular hardware register may also have one or more input sets of gates. For example, data on cable 57 may be entered into a particular hardware register in response to enabling signals from a decoder 73.

An example of this parallel and simultaneous functioning of various hardware registers will be described in connection with any System/370 instruction which involves an address generate phase utilizing the D2 field 15, B2 field 16, and X2 field 17. This address generate phase will be required, not only for a load instruction to be discussed in more detail subsequently, but other instructions which require transfer of data from the main storage to the CPU for processing.

During the address generate phase, the binary coded representation of GPR's specified by the X2 field 17 and B2 field 16 will be applied to decoder 70 and 71 to enable output gates associated with the Pointer Registers 46 corresponding to the instruction identifying GPR's to provide simultaneous and parallel outputs on busses 68 and 69. The 8-bit pointer value associated with the X2 identified GPR, and B2 identified GPR will be transferred on busses 68 and 69 to decoders 74 and 75 respectively. The decoding of the 8-bit pointers provided as inputs to decoders 74 and 75 will be effective to select the proper output set of gates of the accessed GPR Extension Registers 32 which will provide, on busses 19 and 20, the stored value of the base address and address index value to the Address Adder 13. At the same time, the address displacement value D2 is applied to the Address Adder 13 on line 21 to provide the storage address on bus 22 which is then presented to the main storage device to initiate access.

As indicated previously, some System/370 instructions require the previously described address generate phase, but will cause the data transferred to the CPU from the main storage device to be combined with other data in the CPU. The combined data is to be stored in an instruction addressable GPR identified by the R1 field 18, Signal line 66 indicates a "Not Load Instruction", and gates 65 will be enabled to transfer to the CPU, on cable 50, the pointer value associated with the GPR identified by the R1 field 18. When the instruction processing has been completed, and the processed data is to be stored into a GPR identified by the R1 field 18, the pointer transferred to the CPU on cable 50 will be returned to FIG. 5A on cable 51 to decoder 76. The proper GPR Extension Register 32 will be accessed for storage of the processed data received from the CPU on cable 49.

Certain other System/370 instructions involve data processing of data stored in two GPR's identified by the R1 field 18, and a GPR identified by a field R2. The position in the instruction of the field labeled R2 coincides with that of the field labeled X2 when address generate phases are required. Therefore, the decoder 70 will receive the coded GPR indication of the R2 field to readout an associated pointer value on cable 68 to be applied to decoder 74 to enable readout of the proper GPR Extension Register 32 on bus 30 for presentation to the CPU. The results of the data processing are to be returned to the GPR register identified by the R1 field 18. The associated pointer value was previously transferred on cable 50 to the CPU for return on cable 51 along with the processed data on cable 49. The cable 68 at the output of Pointer Registers 46 will be gated by a signal line 77 for any instruction. That is, whether it is an address generate type of instruction or an instruction involving a GPR identified by a R2 field, the information on cable 68 will be transferred to decoder 74 to effect readout of the proper GPR Extension Register 32, either to cable 30 or cable 20.

As just discussed, essentially all of the functional units and interconnections shown in FIG. 5A are utilized during any instruction decode and/or address generate phase, and for the storage of processed data at the completion of instruction execution. FIG. 5B shows the units and cabling involved when the instruction decode phase has detected the existence of a load instruction in the instruction register. This is indicated on a signal line 78. Whenever an address generate phase is required involving a base address from a GPR identified by a B2 field 16, the B2 pointer obtained from the Pointer Registers 46 will be stored in a register 79. In response to the generation of the "Load Instruction" signal on line 78, sets of gates 80 and 81 will be effective to transfer the B2 pointer and D2 field 15 to the Renaming Pointer Storage 59 in FIG. 5B.

In response to detecting the "Load Instruction" signal 78, the first step in achieving the results of the present invention involve utilization of the Renaming Pointer Storage 59 for the purpose of effecting an associative search of the entries. This is initiated by energizing gates 82 and 83.

Details of the Associate Control 84 of the Renaming Pointer Storage 59 are found in the above referred to Cross-Reference number 2. The Associate Control 84 will be effective to analyze the results of the search initiated by gates 82 and 83 to determine whether or not the B2 pointer and D2 field compare with any of the 256 entries presently stored in the Renaming Pointer Storage 59. The results of this comparison operation will provide either a Match signal 85 or a No-Match signal 86. The No-Match signal 86 will create signal lines 87 and 88 to identify one of the 256 locations in the Renaming Pointer Storage 59 which is to receive a new entry. The storage of the new entry will be effected by the signal line 88 enabling gates 89, 90, and 91 to create a new entry including the appropriate B2 pointer on cable 62, D2 field on cable 61, and pointer on cable 60 to be associated with the GPR identified by the R1 field.

Assuming the finding of a match in the Renaming Pointer Storage 59, the Match signal 85 will be effective at gate 92 to readout the R1 pointer on cable 63 to a Rename Pointer Register 93. This indicates that the data being requested from the main storage device is presently stored in one of the GPR Extension Registers 32. The pointer value contained in Rename Pointer Register 93 will be transferred by enabling gates 94 to transfer this pointer on cable 57 to the Pointer Registers 46. The Pointer Register 46 to receive the pointer value on cable 57 will be indicated by decoder 73 receiving its input from the R1 field 18.

The match, signal 85 also enables a set of gates 95 to transfer the pointer value to a decoder 96 which will effect access to the identified GPR Extension Register 32 for transfer of data on cable 30 to the. CPU for use in the previously discussed validation procedure. The pointer value on cable 57 is also transferred by cable 58 to the CPU as part of the validation process. If it should be determined that the data returned from the main storage device is not the same as the data transferred on cable 30, the pointer value will be returned on cable 51 to decoder 76 to access the identified GPR Extension Register 32 for storage of the data on cable 49.

When an entry is not found in the Renaming Pointer Storage 59, indicated by the No-Match signal 86, the GPR identified by the R1 field 18 must be assigned a pointer value. This will be effected by energizing a set of gates 97 to transfer the coded R1 field on cable 28 to a decoder 98 to enable a pointer assignment unit associated with the identified GPR. A number of methods of assigning unique pointers for a particular GPR are available. Shown in FIG. 5B are a number of tables each associated with a particular instruction addressable GPR. The table associated with GPR "0" will be described. The Pointer Assignment Control 99, in response to energization from decoder 98 on line 100, will cause readout of a table location containing an 8-bit pointer value. Pointer values having a modulus 16 are provided for each of the GPR's. The first entry for GPR "0" contains all binary 0 values. The second entry, providing a second pointer for GPR "0", has a coded value of "16". The third entry would have a coded value of 32. Likewise, the table associated with GPR "1" has a first pointer of "1" and a second pointer value of "17". The Pointer Assignment Control 99 associated with each of the tables, when energized by the decoder 98 on line 100, will be effective to read out a pointer value on a bus 55 to bus 56 for entry in the Rename Pointer Register 93. The Pointer Assignment Control 99 will then step to provide access to the next table entry when required.

A new entry will now be made in the Renaming Pointer Storage 59 by means of the signal line 88 enabling gates 89, 90 and 91 to provide storage of the B2 pointer on cable 62, D2 field on cable 61, and the newly assigned pointer value in the Rename Pointer Register 93 on cable 60.

As a result of the No-Match signal 86, the newly assigned pointer value for the GPR indicated by the R1 field 18 must be transferred to the Pointer Registers 46. The No-Match signal 86 will be effective at a set of gates 101 to transfer the newly assigned pointer value from Rename Pointer Register 93 on cable 57 to the input of the Pointer Registers 46. The pointer value will be entered into the proper Pointer Register 46 as indicated by the output of decoder 72.

Also, the newly assigned pointer value in Rename Pointer Register 93 is transferred to the CPU on cable 58. The No-Match signal 86 indicates that the main storage device must be accessed at the address provided on cable 22 and the data transferred to the CPU for storage. The pointer value identifying the GPR Extension Register 32 to receive the data is returned on cable 51 to decoder 76 when the data is received from the main storage device and presented by the CPU data flow on cable 49 to the GPR Extension Registers 32.

As a result of the previously described preferred embodiment of the present invention, a substantially larger number of hardware registers in the CPU of a System/370 data processing system have been provided than could previously be implemented in compliance with previously defined capabilities of an existing instruction format. Whereas the existing System/370 instruction formats only permit the identification of 16

GPR's for instruction addressability, the present invention has substantially increased that number to 256 hardware registers in a CPU for immediate and rapid access. Data processing efficiency has been improved by eliminating the address generate interlock in some situations. This is achieved by allowing the continued storage of data in the high speed hardware registers from previous processing, which in the past would have been destroyed.

Although this invention has been shown and described with respect to the preferred embodiment thereof, it should be understood by those skilled in the art that various changes and omissions in the form and details of the invention may be made therein without departing from the spirit and the scope of the invention.

Having thus described my invention, what I claim as new and desire to secure by Letters Patent is:

1. A data processing system having main storage means comprising addressable locations containing data and instructions, a central processor including an instruction register connected to the main storage means for receiving and storing instructions including a first binary field representing an address displacement value and indentifying a particular addressable main storage location, one or more second binary fields each identifying one of a predetermined number (n) of instruction addressable general purpose registers, and an operation field specifying an operation to be performed, one operation being a load instruction effecting transfer of data to a specified one of said instruction addressable general purpose registers, and transfer means responsive to a central processor generated main storage address for fetching and transferring to the central processor the data and instructions, the improvement allowing access to a larger number (m) of general purpose registers without increasing the size of said second binary fields comprising:
 a plurality m of hardware registers in the central processor for storing data transferred from the main storage means in the central processor, including access means for effecting read-in or read-out of data in said plurality of hardware registers, said plurality m being greater than the predetermined number of instruction addressable general purpose registers identified by the one or more second binary fields of an instruction, and
 register renaming means, including means connected and responsive to the first binary field and the second binary fields of a load instruction, and connected to said access means of said plurality m of hardware registers, said register renaming means controlling further access to one of said plurality m hardware registers in response to identification of one of said n instruction addressable general purpose registers.

2. A data processing system in accordance with claim 1 wherein said register renaming means further includes:
 a plurality of pointer registers each comprised of s binary bit positions, where each of $2^s = m$ permutations of the set and reset state of identify one of said plurality m of hardware registers, said plurality of pointer registers being equal to said predetermined number n of said instruction addressable general purpose registers, each said pointer register including access control means connected to the second binary fields of an instruction for read-in or read-out of a pointer value when a particular one of said n instruction addressable general purpose register is identified, and
 connecting means between said pointer registers and said access means of said plurality of hardware registers, for transferring the contents of one or more of the corresponding ones of said pointer registers to said access means of said hardware registers to thereby effect read-in or read-out of data, whereby identification of a particular one of said predetermined number n of instruction addressable general purpose registers will effect access to a predetermined one of said plurality m of hardware registers identified by the permutation of said s binary bits of a particular one of said pointer registers.

3. A data processing system in accordance with claim 2 wherein a load instruction is more particularly defined as having a first binary field representing an address displacement value which is added to a main storage base address value store in an instruction addressable base register identified by one of the second binary fields, and another one of the second binary fields identifies an instruction addressable destination register to receive and store the data from the particular addressable main storage location, and said register renaming means further includes:
 pointer storage means, including a plurality (m) of entries, each of said entries associated with a previous execution of a load instruction, each entry comprised of the address displacement value, the pointer value stored in the one of said n pointer registers corresponding to the instruction addressable destination register,
 said pointer storage means including comparing means, operative during load instruction execution for comparing the address displacement value and pointer value corresponding to the instruction addressable base register of the load instruction with all entries in said pointer storage means for producing a match signal when there is an identical entry, and
 pointer loading means connected from said pointer storage to said pointer registers, and to said match signal, for transferring the associated destination register pointer value of the identical entry to the one of said n pointer registers corresponding to the instruction addressable destination register identified by the load instruction being executed.

4. A data processing system in accordance with claim 3 wherein said comparing means produces a no-match signal when there is no equality, and said register renaming means further includes:
 pointer assignment means one for each of the n instruction addressable general purpose registers for producing a set of pointer values comprised of s binary bits unique to the associated instruction addressable general purpose register, connected to and rendered operable by the another of the second binary fields of a load instruction and said no-match signal for producing a new pointer value output signal;
 means connecting said new pointer value output signal from said pointer assignment means to said access means of said pointer registers for read-in to the one of said n pointer registers corresponding to the load instruction identified addressable destination register; and pointer storage updating means, connected and responsive to said no-match signal, and said new pointer value, for storing in said pointer storage means a new entry comprised of said new pointer value, the load instruction address displacement value, and the pointer value stored in the one of said n pointer registers corresponding to the load instruction addressable base register.

* * * * *